United States Patent [19]
Charpentier

[11] 3,910,197
[45] Oct. 7, 1975

[54] OVERHEAD CONVEYOR
[75] Inventor: Jean G. Charpentier, Massy, France
[73] Assignee: Societe Anonyme dite: S.I.E.T.A.M., Kennedy, France
[22] Filed: May 2, 1974
[21] Appl. No.: 466,498

[30] Foreign Application Priority Data
May 4, 1973 France .............................. 73.16194

[52] U.S. Cl. ...................... 104/89; 104/48; 104/98; 104/168; 198/127 R
[51] Int. Cl.² ...................... B61B 3/00; E01B 25/22
[58] Field of Search ............ 104/48, 49, 50, 89, 91, 104/94, 95, 96, 97, 98, 106, 107, 168, 172 R, 172 S; 198/177 R, 130, 127 R

[56] References Cited
UNITED STATES PATENTS

| 714,592 | 11/1902 | Marsh | 104/168 |
| 939,334 | 11/1909 | Schmidt | 104/168 |
| 3,432,046 | 3/1969 | Krusinski | 104/48 X |
| 3,537,402 | 11/1970 | Harkess | 104/168 |
| 3,735,710 | 5/1973 | Hickman | 104/168 |
| 3,759,188 | 9/1973 | Woods | 104/168 |

FOREIGN PATENTS OR APPLICATIONS
572,604  10/1945  United Kingdom ............. 198/177 R Primary Examiner—M. Henson Wood, Jr.
Assistant Examiner—Randolph A. Reese

[57] ABSTRACT

A suspended overhead conveyor comprising a bearer on which are installed two sets of entraining elements, one set at each side of the bearer, arranged in two substantially parallel lines, on each of which is adapted to rest a runner of a suspended carriage, the entraining elements being adapted to entrain the runners, guides being provided to guide the runners on the entraining elements.

13 Claims, 5 Drawing Figures

OVERHEAD CONVEYOR

The invention relates to overhead conveyors particularly for use in production lines.

There are two kinds of conveyors, namely floor mounted conveyors on which objects are conveyed, and the overhead conveyors comprising suspended pans or the like, which convey the objects.

The floor mounted conveyors crowd the workshops, and hence the overhead conveyors which leave the floor-space unencumbered, are frequently to be preferred. However, the overhead conveyors commonly comprise a suspended rail on which runs a carriage supporting the suspended pan, which tends to swing about its fastening point. Moreover, these carriages are frequently drawn along by chains, which forces the carriages to move forward in synchronous manner. Finally, changes in direction or take-over actions by parallel conveyors require complex switching and transfer apparatus.

An object of the invention is to devise an overhead conveyor which leaves the floor-space unencumbered and eliminates the troublesome swinging actions of the carried objects.

The present invention consists in a suspended overhead conveyor comprising a bearer on which are installed two sets of entraining elements, one set at each side of the bearer arranged in two substantially parallel lines, on each of which is adapted to rest a runner of a suspended carriage equipped with coupling means, the entraining elements being adapted to entrain the runners, guiding means being incorporated to guide the runners on the entraining elements.

Some preferred embodiments according to the invention will be described with respect to the accompanying drawings, in which.

Figure 1:
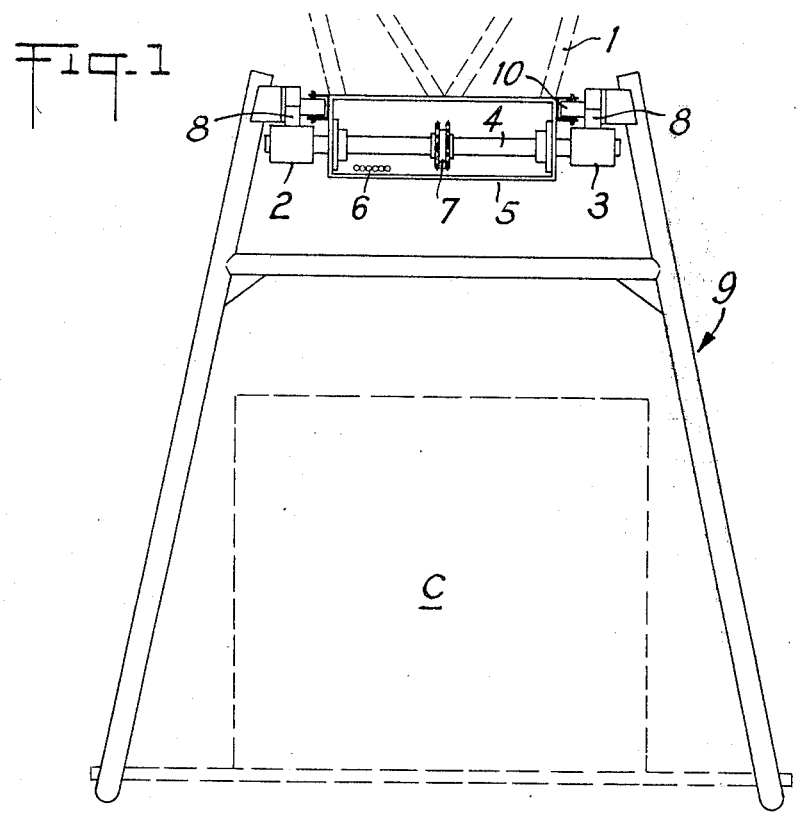
FIG. 1 is a cross-sectional view of a conveyor according to the invention.
Figure 2:
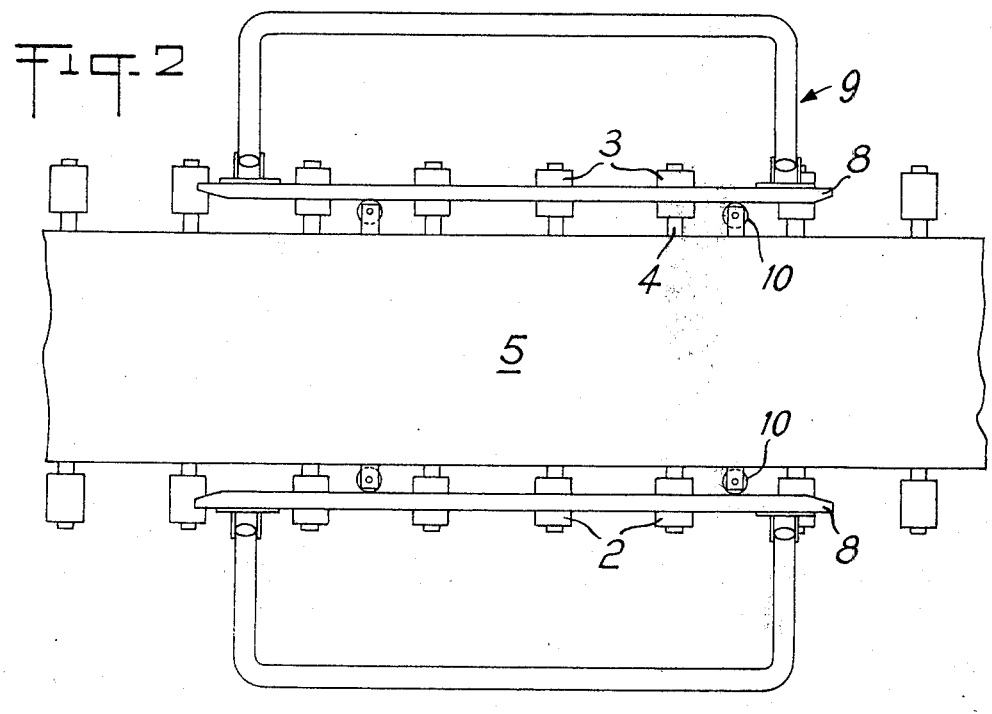
FIG. 2 is a plan view of the conveyor of FIG. 1.

An overhead conveyor according to the invention comprises a bearer 1 whereon are installed two sets of rollers 2 and 3 forming two parallel lines of rollers at either side of the bearer. Each roller 2 of a line is installed at one end of a shaft 4 at the other end of which is installed a roller 3 of the other line.

A box-section 5 encloses all the shafts 4 and contains electrical conductors 6 serving the purpose of supplying and controlling driving motors 7 of the shafts 4.

Runners 8, each of which bears on at least two rollers 2 or 3, rest on these rollers 2 and 3. These runners are fixed to a frame 9, forming a suspended carriage which is movable by means of the rollers which, whilst revolving, entrain the carriage by friction. This carrier 9 receives the load which is to be conveyed.

So that the runners may remain satisfactorily centered on the rollers, a guiding device is provided comprising rollers 10 installed on the bearer with their axes vertical, the runners being laterally located by the rollers 10. Inversely, the runners could be equipped with lateral rollers rolling in contact with a lateral guiding bearer.

Figure 3:
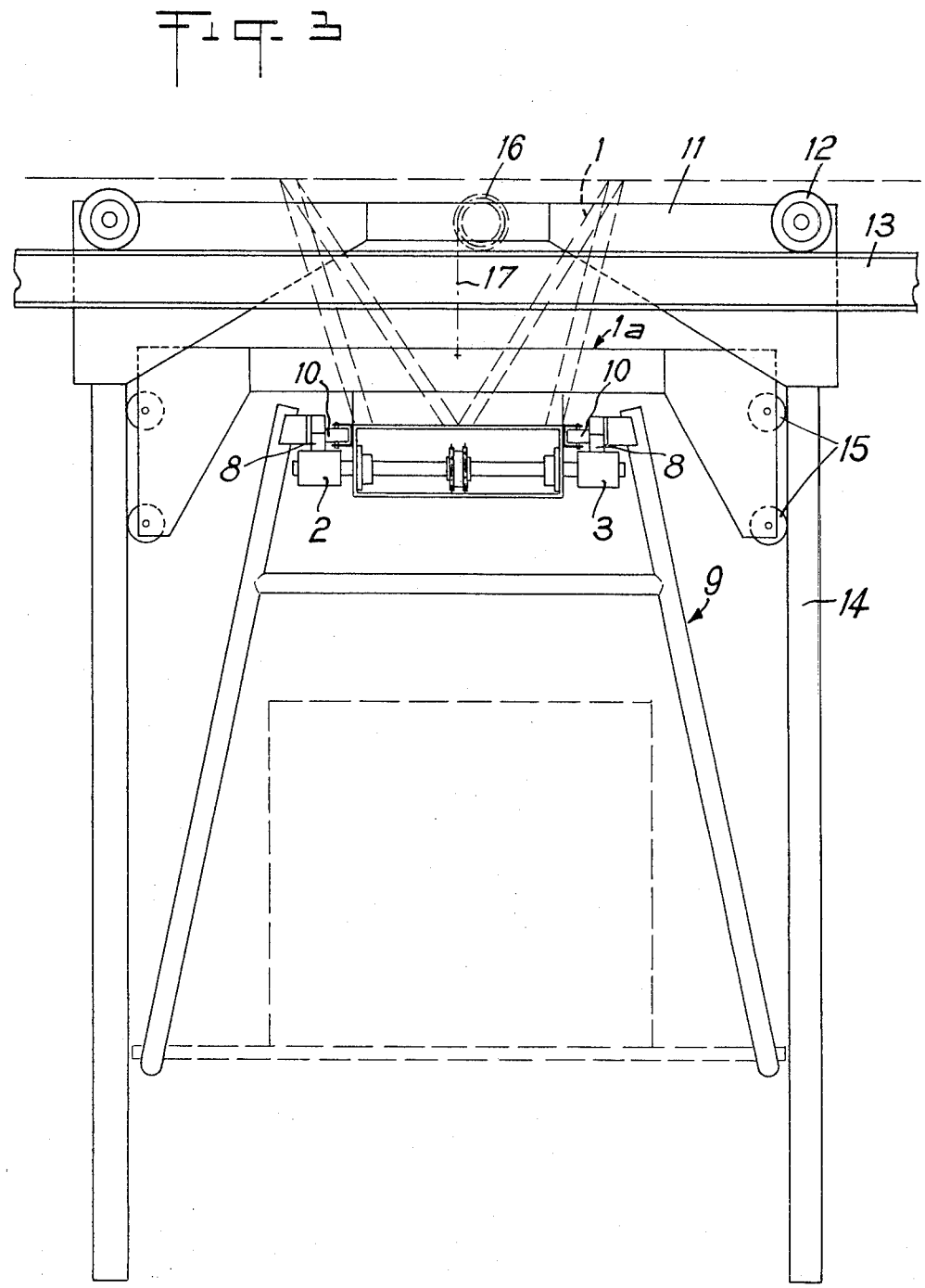
FIG. 3 is a view analogous to that of FIG. 1, showing a movable section of the bearer of the conveyor according to the invention.

So that changes in direction and transfers from one conveyor to the other may be performed, a bearer section complete with its rollers is rendered movable as illustrated in FIG. 3.

A section 1a is thus installed on a carriage 11 equipped with wheels 12 which run on rails 13 positioned transversely with respect to the section 1a of the conveyor. This enables the carriage 9 to be transferred to another parallel conveyor at the same height, another section lacking a carriage 9 being arranged to replace the section 1a to maintain the continuity of the conveyor.

If it is intended to change direction and to switch the carriage 9 to a non-parallel conveyor, the section 1a is made rotatable with respect to a vertical axis in the carriage 11 or in the stationary bearer.

Finally, if it is intended to obtain a change in level, the carriage is equipped with vertical guides or slideways 14 in which is displaceable the bearer section 1a, the latter being equipped with rollers 15 running on the guides 14. The displacement is performed by means of a motor-winch set 16 installed on the carriage 11 and acting on a cable 17 coupled to the bearer 1a.

Figure 4:
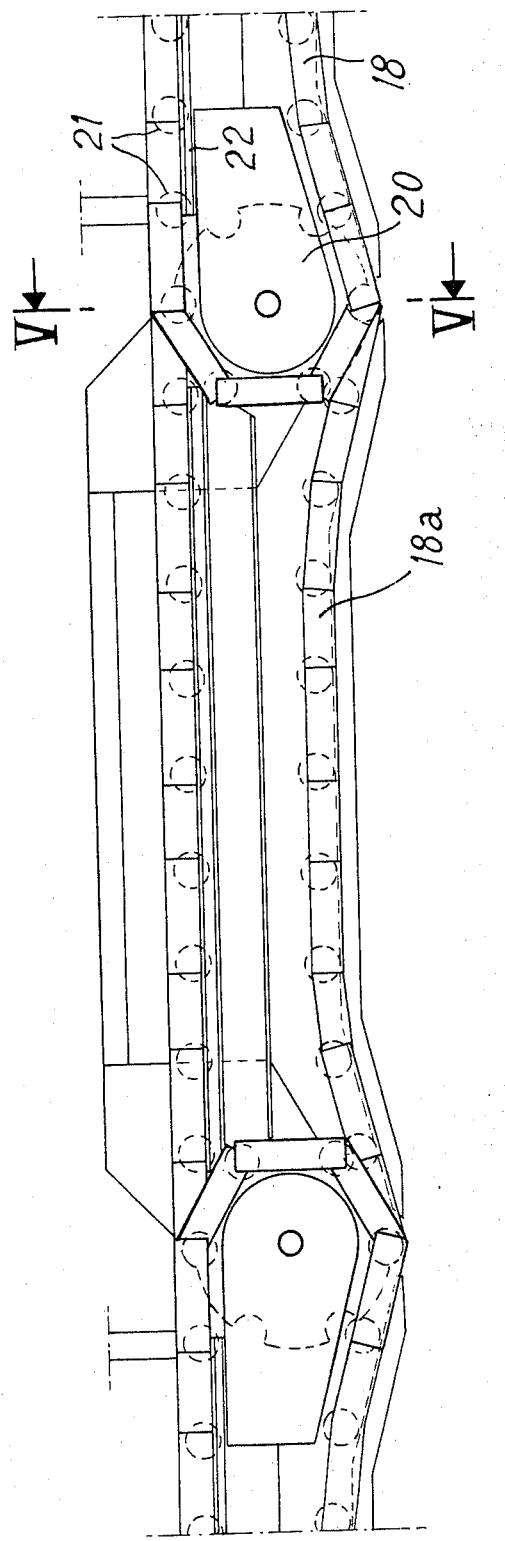
FIG. 4 is a sideview of a modified form of embodiment of a conveyor according to the invention.
Figure 5:
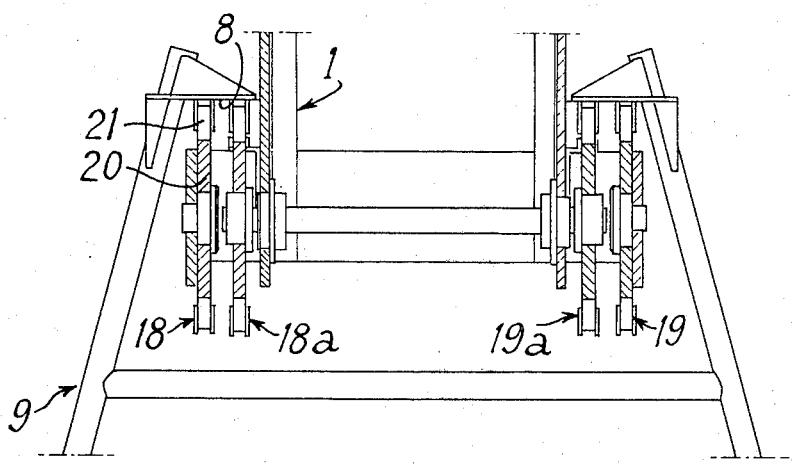
FIG. 5 is a cross-section along the line V—V of FIG. 4.

In accordance with the invention, the conveyor illustrated in FIGS. 4 and 5 comprises entraining elements consisting of chains 18 and 19 situated at either side of the bearer 1. The runners 8 of the suspended carriages 9 bear on these chains.

The chains are driven by sprockets 20 and the spindles of the links are equipped with rollers 21 which run on a rail 22, forming a rolling track for the purpose of supporting the chain between the sprockets and to be certain that it remains perfectly straight and horizontal in order to provide appropriate support for the carriages, the runners of which bear on the links.

The conveyor may comprise several consecutive sections, some of which may be movable.

Each section comprises two chains 18 and 19 extending in planes which are parallel and close to the chains 18a and 19a of the following section so that the runner 8 bears on the two chains 18 and 18a at the same time whilst passing from one chain to the other. This renders it possible to prevent jolting of the carriage upon passing from one section to the other.

Various modifications may be made within the scope of the invention.

I claim:

1. A suspended overhead conveyor comprising a bearer, at least one suspended carriage, and guiding means, the bearer comprising two sets of entraining elements and each suspended carriage depending from two runners; the two sets of entraining elements being installed on and one at each side of the bearer in two substantially parallel lines, each of the runners being adapted to rest on its respective set of entraining elements and to be frictionally entrained thereby, the guiding means being arranged to guide the runners on the entraining elements.

2. An overhead conveyor according to claim 1, in which the entraining elements comprise rollers arranged in two parallel lines, each runner being adapted to rest on at least two rollers, of which at least one is a driving roller.

3. An overhead conveyor according to claim 1, in which there is provided a track and the entraining elements comprise a plurality of parallel chains, each chain having link spindles and rollers, the link spindles being equipped with the rollers which are adapted to roll on the track, the runners being arranged to rest on the links.

4. An overhead conveyor according to claim 3, in which each chain is provided with at least one driving sprocket, there being situated substantially in two parallel vertical planes, the entraining area of one chain overlapping that the following chain, the runners of the carriage having a greater width than two chains place side-by-side.

5. An overhead conveyor according to claim 3, comprising a movable section and at least one stationary section, the extremities of the chains of the movable section being situated adjacent the chains of each stationary section.

6. An overhead conveyor according to claim 1, in which the bearer is provided with a movable section.

7. An overhead conveyor according to claim 6, in which the movable section is pivotable about a vertical axis.

8. An overhead conveyor according to claim 6, in which there is provided a further carriage, the movable section being attached to the further carriage which may be displaced transversely to the lines of rollers.

9. An overhead conveyor according to claim 6, in which there are provided vertical slideways, the movable section being installed on the vertical slideways along which it is displaceable.

10. An overhead conveyor according to claim 1, in which the guiding means comprises lateral rollers secured to the bearers in contact with which the runners slide.

11. An overhead conveyor according to claim 1, in which the guiding means comprises rollers and there is provided a rolling track, the rollers being attached to each carriage, rolling at either side of the rolling track which is attached to the bearers.

12. An overhead conveyor according to claim 1, in which the guiding means comprises rollers attached to the runners or carriages, rolling at either side of a rolling track attached to the bearer.

13. An overhead conveyor according to claim 1, in which each entraining element of a line is coupled to a corresponding entraining element of the other line.

* * * * *